Patented Nov. 18, 1924.

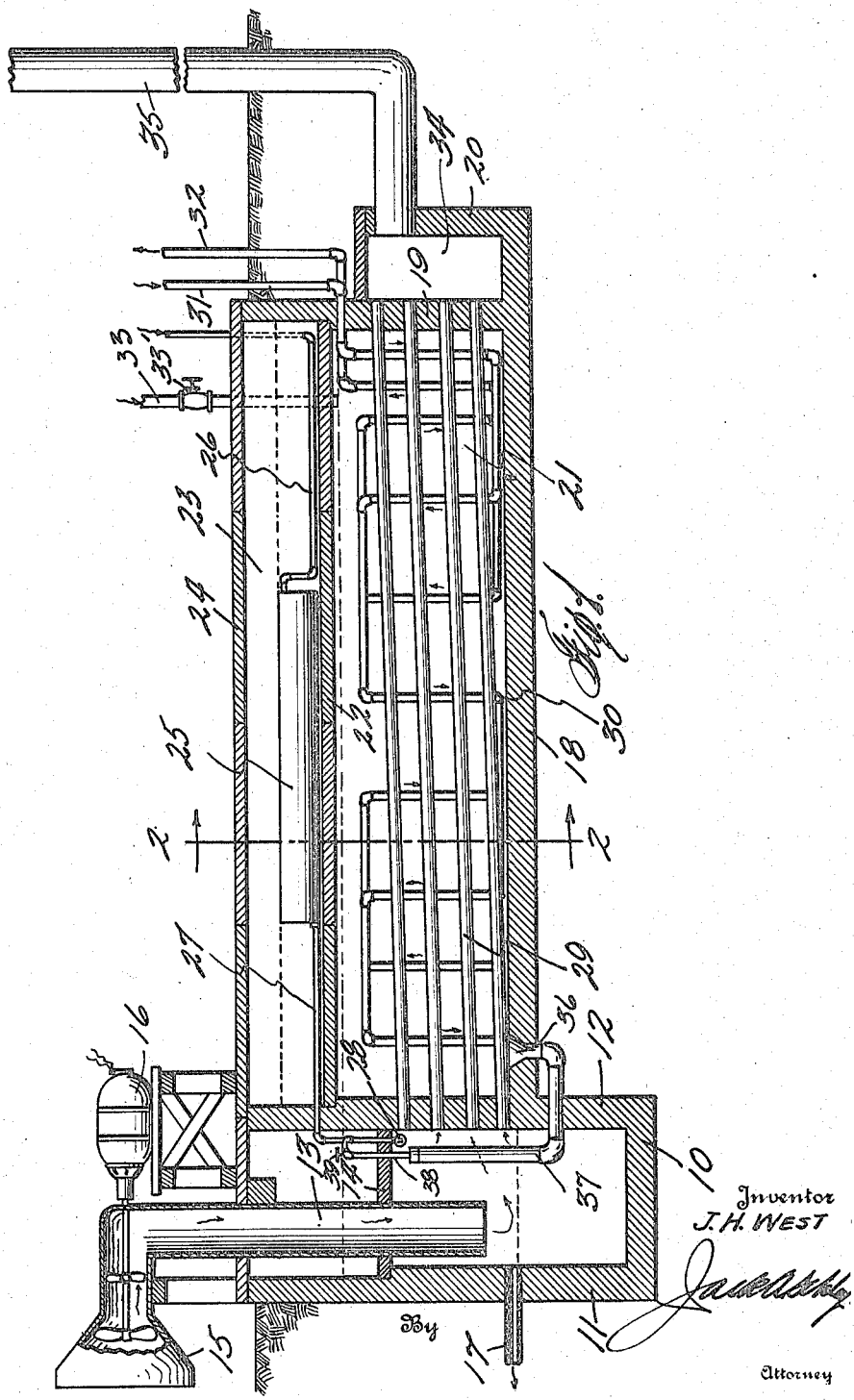

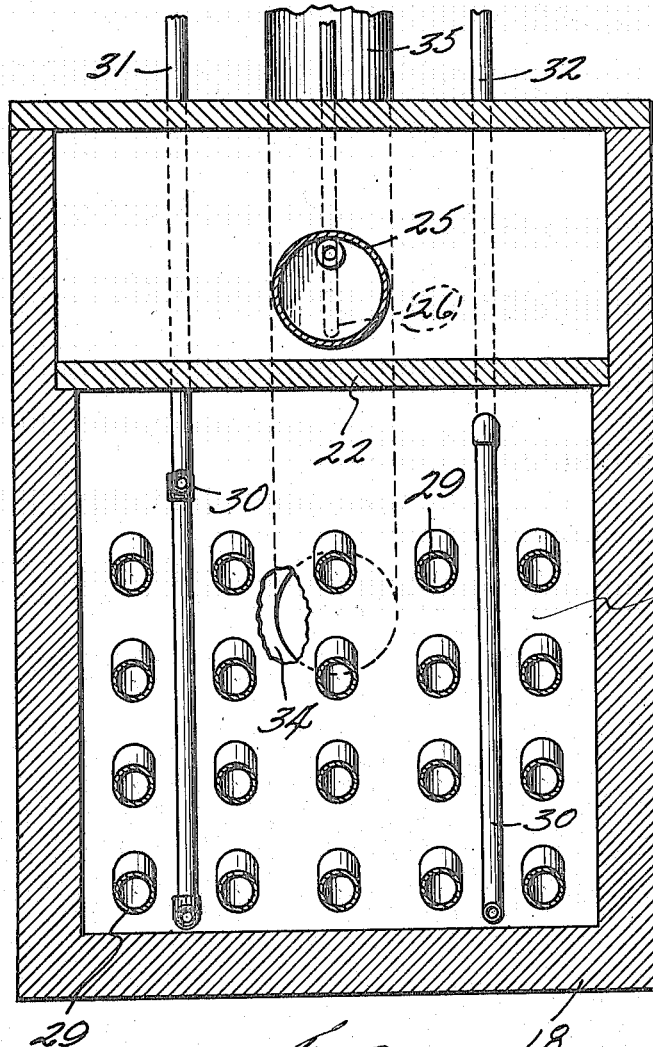

1,515,898

UNITED STATES PATENT OFFICE.

JACK H. WEST, OF WACO, TEXAS, ASSIGNOR OF FIVE PER CENT TO O. K. HERNDON, OF KANSAS CITY, MISSOURI.

AIR-COOLING SYSTEM.

Application filed July 21, 1923. Serial No. 652,989.

*To all whom it may concern:*

Be it known that I, JACK H. WEST, citizen of the United States of America, residing at Waco, in the county of McLennan and State of Texas, have invented certain new and useful Improvements in Air-Cooling Systems, of which the following is a specification.

My invention relates to new and useful improvements in air cooling systems.

The object of the invention is to provide a simple, efficient and comparatively inexpensive means of cooling air and setting up a circulation with the aid of refrigeration.

A particular object is to pass the air through or immediately over a vat of fresh water collected from a cold spray, through which the water is also passed; prior to its entrance into the refrigerating chamber, whereby the air is washed pre-cooled, and the humidity eliminated.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a longitudinal sectional view of a system constructed in accordance with my invention, and Fig. 2 is an enlarged transverse vertical sectional view taken on the line 2—2 of Fig. 1.

In the drawings the numeral 10 designates a vat built of concrete or other suitable material and placed preferably under ground. An end wall 11 rises from the vat on one side and a partition wall 12 is built on the other side. An air admitting duct or pipe 13 extends down through a cover plate 14 into the vat. The pipe is bent at right angles and has a suction fan 15 at its upper end suitably driven by a motor 16. A water level is maintained immediately below the pipe 13 by an overflow pipe 17.

A base wall 18 extends from the wall 12 and a second partition 19 and an end wall 20 rise therefrom. Between the walls 12 and 19 a refrigerating chamber 21 is formed above the base wall and this chamber is sealed by a roof 22. Above the roof a cooling chamber 23 is formed between the walls 12 and 19 and this latter chamber is sealed by the floor 24 or other platform. The chamber 23 contains a cooling tank 25. A fresh water pipe 26 supplies water to the tank and a pipe 27 leading therefrom extends through the wall 12. The chamber 23 is filled with sawdust or other insulating material and the tank lying directly above the roof 22 is cooled by the chamber 21.

The pipe 27 passes down through the plate 14 and has a spray nozzle 28 on its lower end just under said plate, whereby fresh cold water is sprayed into the vat 10. The air which is drawn into the pipe 13 by the suction fan 15 is discharged into the vat 10 and passes immediately over the water. The air then comes into contact with the spray by passing through the same and then enters upwardly inclined tubes 29 supported in the walls 12 and 19 and passing through the refrigerating chamber 21. The air in passing through the dip vat 10 and the spray is washed and pre-cooled and also is robbed of its humidity.

A cooling coil 30 is disposed longitudinally of the refrigerating chamber 21 having a supply pipe 31 and a return pipe 32 passing through the wall 19. Ammonia or any other suitable refrigerating fluid is circulated through the coil and the chamber may be given a temperature below freezing or at any degree of Fahrenheit desired. A water pipe 33 having a cut-off valve 33' enters the chamber 21 through the roof 22 and this chamber may be filled with water or a brine solution.

In operating the system the apparatus is preferably placed underground, as in the basement of a public building, theatre or residence, etc., but it may be otherwise located. The air is drawn in by the fan 15 and discharged from the pipe 13 into the vat 10. From the vat the air passes into tubes 29 extending through a refrigerating chamber 21. In passing through the vat the air passes through a spray of cool fresh water falling from a nozzle 28. This water is supplied from the storage tank 25.

The air in passing through the vat and spray is pre-cooled, washed and robbed of its humidity. The chamber 21 maintains the tubes at the required temperature to refrigerate the air. The cold air is discharged from the tubes into a compartment 34 from which a duct 35 leads to the point of distribution. It will be seen that air thus handled will be fresh, clean and cool. The system may be operated at a minimum expense and the initial cost of installment will be comparatively low.

When it is desired to drain the chamber 21 a drain hopper 36 in the wall 18 is utilized. This hopper has connection with an angular pipe 37 which passes through the wall 12, into the vat 10 and up to a point below the platform 14. A spray pipe 38 including a cut-off valve 39 is connected with the spray pipe 27. Clean water may be supplied through the pipe 33 and the chamber washed out.

Where cold well or spring water is available the chamber 21 may be filled with the same and the coils 30 not used. Also the tank 25 may be dispensed with as the cold water may pass through the pipe 37 and furnish the spray. Various changes in the arrangement and structure of the different parts as well as modifications and alterations may be made within the scope of the appended claims.

What I claim, is:

1. In an air cooling system, an air supply, a vat receiving air from said supply, a water cooling tank, a spray nozzle discharging into said vat and connected with said tank, a refrigerating chamber, a refrigerating coil for circulating a refrigerating fluid through said chamber, and a plurality of air conducting tubes extending longitudinally through said chamber.

2. An air cooling system, an air supply, a vat receiving air from said supply, a water cooling tank, a spray nozzle discharging into said vat and connected with said tank, a refrigerating chamber, a circulating coil in said chamber, a fluid admitting inlet for said chamber, a fluid outlet for said chamber, and a plurality of air conducting tubes extending through said chamber from the vat and inclined toward the latter.

3. In an air cooling system, a refrigerating chamber, a water cooling tank contiguous to said chamber and cooled thereby, air passages extending through the chamber, a cold water spray immediately in advance of said tubes and supplied by said tank, and means in advance of the spray for supplying air.

4. In an air cooling system, a refrigerating chamber, a water cooling tank contiguous to said chamber and cooled thereby, air passages extending through the chamber, a cold water spray immediately in advance of said tubes and supplied by said tank, means in advance of the spray for supplying air, a vat containing water from the spray and located between the air supply and the spray.

5. In an air cooling system, an air supply pipe having a suction fan at its entrance, a vat below the discharge end of said pipe, an overflow pipe extending from the vat, a refrigerating chamber contiguous to the vat, a cooling chamber contiguous to the refrigerating chamber, a fresh water tank in the cooling chamber, air conducting tubes extending through the refrigerating chamber, a spray nozzle connected with the tank and discharging a spray into said vat immediately in front of said tubes, a circulating coil in the refrigerating chamber, and an air conductor connected with the tubes.

In testimony whereof I affix my signature.

JACK H. WEST.